Dec. 14, 1948.  A. E. GESSLER ET AL  2,455,926
AUTOMOBILE BODY STRUCTURE
Filed Feb. 20, 1942
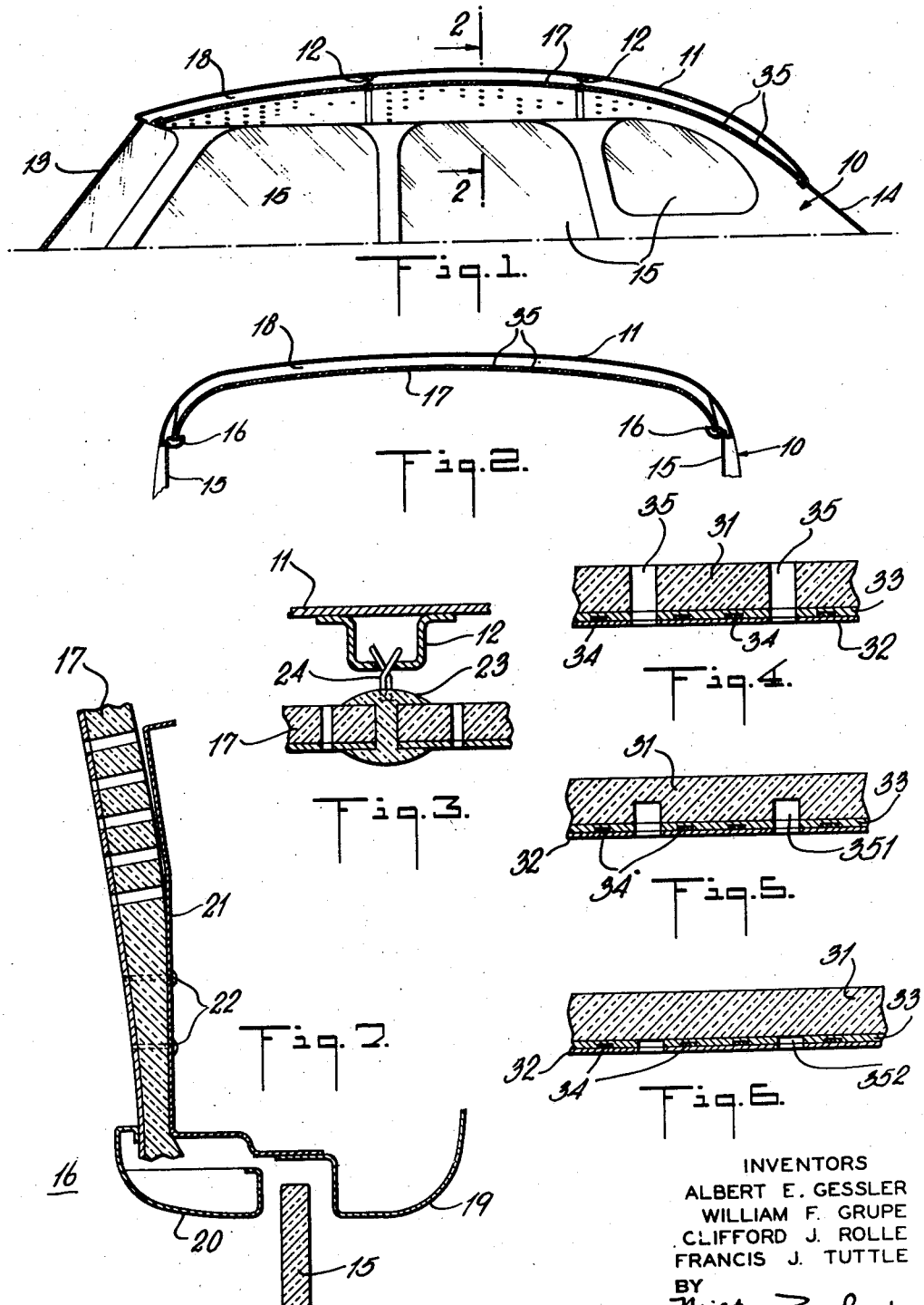
INVENTORS
ALBERT E. GESSLER
WILLIAM F. GRUPE
CLIFFORD J. ROLLE
FRANCIS J. TUTTLE
BY
Milton Zucker
ATTORNEY Patented Dec. 14, 1948

2,455,926

UNITED STATES PATENT OFFICE 2,455,926

AUTOMOBILE BODY STRUCTURE

Albert E. Gessler, Scarsdale, N. Y., William F. Grupe, Lyndhurst, N. J., and Clifford J. Rolle, Yonkers, and Francis J. Tuttle, New York, N. Y., assignors to Interchemical Corporation, New York, N. Y., a corporation of Ohio Application February 20, 1942, Serial No. 431,636

8 Claims. (Cl. 296—137)

1

This invention aims to provide a new type of automobile body interior, with improved sound and heat insulation, together with novel decorative effects, at lower cost than conventional body interiors. Specifically, this invention relates to automobile body liners comprising rigid, sound and heat insulating sheets which are attached to automobile bodies with a minimum contact to the roofs thereof, and preferably decorated by laminating decorated foils thereto.

At the present time, automobile bodies are lined with a variety of material, in order to produce a finished body in which the road and car noises are not too objectionable. One conventional method of lining bodies is first to attach to the body top an asphalt impregnated felt sheathing having little rigidity, or to spray an asphaltic base slush coat against the metal. This felt or slush coat is placed between the reinforcing beams; it serves to deaden the body rattles. Thereafter, a limp textile fabric covering is cut and sewed to shape, and attached to the car interior by metal bows, spaced from the felt by the depth of the beams; this covering serves both as a decoration and to absorb road noises transmitted by the vibrating steel roof and otherwise coming into the car. This method of lining automobiles has several decided disadvantages. A considerable amount of skilled hand labor is involved in installation; the sound absorption is relatively low and leaves much to be desired; little variety of decorative effects is obtainable; and the material is unsanitary, and very sensitive to scuffing and soiling.

We have discovered a means for improving automobile top liners which has unique decorative possibilities, superior sound absorption and heat insulation values, combined with low installation cost and exceptional ease of cleaning. Our novel means comprises the use of self-supporting liner sections formed in the shape of the automobile body, in such a manner as to be attachable to the body without a rigid connection to the roof, thus forming a complete lining. The individual sections are formed of decorated sound and heat-insulating material, most preferably shaped insulating boards having laminated thereto decorative foils.

The insulating boards used may be of any conventional insulating material capable of being formed into a rigid sheet. "Celotex" board, made from cane sugar fiber, known as bagasse, "Insulite" board (made from wood fiber), laminated creped paper, and the like, may all be used, the important characteristics desired being

2 sound and heat-insulating properties combined with sufficient rigidity for self-support.

The invention may be best understood by referring to the drawings, in which—

Fig. 1 is a partial section through a car body, showing our new liner in place;

Fig. 2 is a section on the line 2—2 of Fig. 1;

Fig. 3 is a detail showing how the sections are joined;

Figs. 4, 5 and 6 are sections through forms of the decorated insulating sheet, used in our invention; and Fig. 7 is a detail showing the manner of attaching the insulating sheet to the car.

Referring to the drawings, an ordinary car body comprises a steel frame body portion 10 and top 11, reinforced with ribs 12, to which is ordinarily attached the usual cloth lining. A windshield 13, a rear window 14 and side windows and doors 15 are mounted in the frame. Above the windows and doors are ledges 16 in the frame, which provide means for attaching window and door frames.

In the practice of our invention, self-supporting boards 17, formed to fit the contour of the spaces between the ledges 16 and the car roof 11 and beams 12, are mounted on the ledges, spaced from the roof in such a way as to provide an air space 18. The ledges may comprise an exterior molding 19 and an interior garnish molding 20, with a clip 21, attached thereto; the insulating board may be tacked or riveted to this clip by fasteners 22.

The individual boards are made into a unitary structure by springing their ends into the notches in H-shaped beads 23, of plastic or similar material, as shown in Fig. 3. If necessary, these may be attached to the beams 12 by hangers 24. The resultant unitary structure is thus essentially a second roof under the first, held in place by its own resilience and that of the ledges 16, and connected to the roof chiefly through these ledges. Because of this sprung connection and the natural resiliency and sound absorbing quality of this sub-roof, it acts to absorb sound from the metallic roof, preventing its transmission to the interior. The air space 18 and the sub-roof both act as heat insulators for the roof, while the board absorbs sound by virtue of its structure.

In order to get the type of styling effect necessary in automobile body construction, the insulating roof must be decorated. The present cloth linings offer a severe limitation to the interior styling. Our lining is faced with a decorated foil of material such as cellulose acetate, cellulose aceto-butyrate, ethyl cellulose, polyvinyl chloride-acetate copolymer, or any other resilient water-resistant foil material. The foil is preferably transparent or translucent, and carries the decoration on the side thereof laminated to the backing. This provides a surface which is resistant to water, soiling, scuffing and wear.

Where a relatively dense board is to be used, we prefer the structure shown in Fig. 4. The base board 31 has united it to a transparent sheet 32 of cellulose acetate or the like transparent hydrophobic foil, carrying on the board side a decoration which may be an overall coating 33 or a print 34, backed up by such an overall coating. This is laminated to the base board, and holes 35 are drilled through the board, preferably at regularly spaced intervals, and to occupy a considerable percentage of the surface area, in accordance with known practice in the sound-treatment of buildings. Such a board may carry any type of design, which is protected against wear by the foil. When mounted in the car, the sound waves will travel through the holes into the porous board and the air space above it, and will resound in these spaces until absorbed.

Where a more porous board is used, we prefer the structure shown in Fig. 5. Here a hole 351 is drilled through the outside sheet and halfway into the acoustic board. In such construction the board absorbs the sound sufficiently so that the re-echoing obtained in the space above the composite sheet is not required.

For very absorbent material (e. g. the very loose "Insulite" board, or loose rock wool) the hole 352 is drilled only through the outer layer, since the sound absorbent material permits the sound to travel into it, and absorbs it by innumerable re-echoings in the mass. In this case, the outer layer of foil may be laminated to a board, or may be a separate laminated structure sufficiently rigid to support the rock wool. A typical construction may be prepared as follows:

A five mil cellulose acetate sheet, matte surfaced on one side, is decorated on the clear or under side by printing with suitable lacquer inks. Over the printed design there is usually coated a solid base or background color, also of a lacquer-type material. Against this lacquered coat there is now laminated a high bulk, 70 lb. paper stock. The cement used for this operation is a lacquer-type thermoplastic film, which can be applied either by spray or coating, the greater portion of the solvent evaporated, and the paper applied thereto by heated rolls.

This decorated, laminated product is now ready to be cemented to, and molded with, a backing of "Celotex" board, preferably ⅜" to ½" in thickness. This is carried out simultaneously as follows: The "Celotex" board is first humidified in a suitable moisture cabinet in order to bring it to a pliable condition. A urea-formaldehyde water syrup adhesive, such as is commonly used in the production of ply-wood, is coated on to both the "Celotex" and the paper side of the laminated sheet. The two are brought together, allowing an overlap of the sheet, which can be clamped at the two ends of the mold, preparatory to forming. The mold is heated to approximately 270° F. and applied with sufficient pressure to deform the sheet and the "Celotex" board to conform to the shape of the mold. The purpose of the elevated temperature of the mold is twofold. First, to warm the acetate sheet sufficiently to permit the flow or formation to the desired shape. Secondly, to convert or "kick over" the urea cement to form a permanent moisture-resistant bond between the foil and the "Celotex" board. The mold is now rapidly chilled by circulating a cooling medium through the mold structure. The mold can then be opened and the finished product, which is now permanently molded, removed.

In place of the "Celotex" board, cited in the above example, we have also found it practical to use "Fiberlite" board, made of wood fibers, of excelsiorlike formation, loosely bonded, with high insulating values for both acoustics and heat. In places where the desired shape requires the highest degree of moldability, not within practical range of the harder boards, we have used a backing, formed of moldable layers of two-way stretch creped paper in place of the "Fiberlite."

In order to give any of these products the maximum acoustical damping effect, it is desirable to have holes through the acetate sheet to permit the sound waves to enter and to be absorbed in the mass of the backing material. Where the mass of this backing material is comparatively dense, as in "Celotex," the holes should be drilled well into, or through the entire body of the board in order to permit the sound waves to enter the pores of the backing material throughout its entire thickness as shown in Figs. 4 and 5. In the case of the highly porous "Fiberlite," it is sufficient that the holes merely penetrate the laminated sheet as shown in Fig. 6, since they will then be readily absorbed into the backing material.

In all of the above cases cited, the insulating backing material is rigid enough in its molded form to be mounted in the car with end supports only.

Obviously, many modifications can be made in our invention without departing from the spirit thereof, as defined in the claims.

We claim:

1. A lining for the roof of a body of a movable vehicle which vibrates markedly on movement thereof, comprising a resilient self-supporting non-metallic structure spaced apart from the roof of the vehicle to provide a double roof with an air space between, and supported principally on the ends of the resilient structure resting on ledges attached to the sides of the body below the roof, the structure having a coating on the bottom thereof, impervious except in the portions thereof which are punctured by holes which penetrate through the coating at least to a backing of sound absorbent material back of the coating.

2. A lining for the roof of an automobile body comprising a resilient self-supporting structure spaced apart from the roof of an automobile to provide a double roof with an air space between, and supported principally on the ends of the resilient structure resting on ledges attached to the sides of the automobile body below the roof, the structure comprising a sound absorbent backing having laminated thereto a resilient water-resistant foil, and holes penetrating through the foil to the sound absorbent backing.

3. A lining for the roof of an automobile body comprising a resilient self-supporting structure spaced apart from the roof of an automobile to provide a double roof with an air space between, and supported principally on the ends of the resilient structure resting on ledges attached to the sides of the automobile body below the roof, the structure comprising a sound absorbent backing having laminated thereto a resilient water-resistant foil, and holes penetrating through the foil a substantial distance into the sound absorbent backing.

4. A lining for the roof of an automobile body comprising a resilient self-supporting structure spaced apart from the roof of an automobile to provide a double roof with an air space between and supported principally on the ends of the resilient structure resting on ledges attached to the sides of the automobile body below the roof, the structure comprising a sound absorbent backing having laminated thereto a resilient water-resistant foil, and holes penetrating through the foil and the sound absorbent backing into the air space above the structure.

5. The structure of claim 2, in which the foil carries on its laminated side a decoration sandwiched between the foil and the backing.

6. The structure of claim 2, in which the foil is cellulose acetate sheeting.

7. The structure of claim 2, in which the foil is cellulose acetate sheeting laminated to the board by a set urea-formaldehyde cement.

8. The structure of claim 1, in which the structure supports loose sound-absorbent material.

ALBERT E. GESSLER.
WILLIAM F. GRUPE.
CLIFFORD J. ROLLE.
FRANCIS J. TUTTLE.

REFERENCES CITED

The following references are of record in the file of this patent:

UNITED STATES PATENTS

| Number | Name | Date |
| --- | --- | --- |
| 973,888 | Stillman | Oct. 25, 1910 |
| 1,332,269 | O'Byrne | Mar. 2, 1920 |
| 1,385,741 | Dillon | July 26, 1921 |
| 2,180,305 | Groskopf | Nov. 14, 1939 |
| 2,207,958 | Tuell | July 16, 1940 |